United States Patent
Chaplin et al.

(10) Patent No.: US 7,478,352 B2
(45) Date of Patent: Jan. 13, 2009

(54) METHOD FOR CREATING BOX LEVEL GROUPINGS OF COMPONENTS AND CONNECTIONS IN A DYNAMIC LAYOUT SYSTEM

(75) Inventors: Carey S. Chaplin, Seattle, WA (US); Monica C. Rosman Lafever, Renton, WA (US); Patrick J. Eames, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 11/472,942

(22) Filed: Jun. 22, 2006

(65) Prior Publication Data

US 2007/0300198 A1    Dec. 27, 2007

(51) Int. Cl.
*G06F 17/50* (2006.01)
(52) U.S. Cl. .................... 716/7; 716/9; 716/10; 716/12; 716/13; 703/1; 703/16
(58) Field of Classification Search ...................... 716/7, 716/9, 10, 12, 13; 703/1, 16
See application file for complete search history.

(56) References Cited

U.S. PATENT DOCUMENTS

2006/0031803 A1* 2/2006 Eichenseer et al. ............ 716/10
2006/0190889 A1* 8/2006 Cong et al. ..................... 716/8
2006/0242613 A1* 10/2006 Fukazawa ....................... 716/8
2006/0294485 A1* 12/2006 Kaul et al. ..................... 716/10
2007/0136709 A1* 6/2007 Rodman ......................... 716/8
2007/0157140 A1* 7/2007 Holesovsky et al. ........... 716/5
2007/0256044 A1* 11/2007 Coryer et al. ................. 716/13

FOREIGN PATENT DOCUMENTS

WO    2007/014257    6/2007

* cited by examiner

*Primary Examiner*—Phallaka Kik
(74) *Attorney, Agent, or Firm*—Tung & Associates

(57) ABSTRACT

A system and method for automatically generating a dynamic layout of a top-level canvas with an internal box layout structure providing a storage element, and a processing element capable of receiving requests to assign a plurality of components within the canvas; assessing both component data and associated connectivity data component related to components having associated parent and child data, and for components without a parent component; connectivity data associated with the component data; and automatically laying out the canvas. Boxes are created inside the top-level canvas diagram, which are sub-canvases to the top-level canvas. Each of these sub-canvases provides components, connectivity elements, and sub-canvases. The methodology is recursive so the diagram can have many levels of boxes inside of boxes. The canvases are positioned with the lowest level of sub-canvas and progressing outward to the next level of sub-canvas until the top-level canvas is displayed.

20 Claims, 4 Drawing Sheets

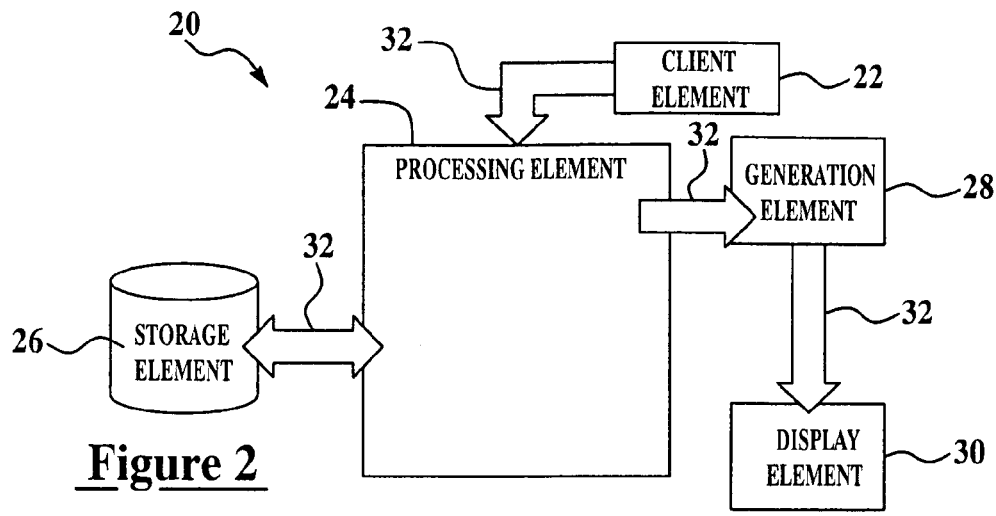
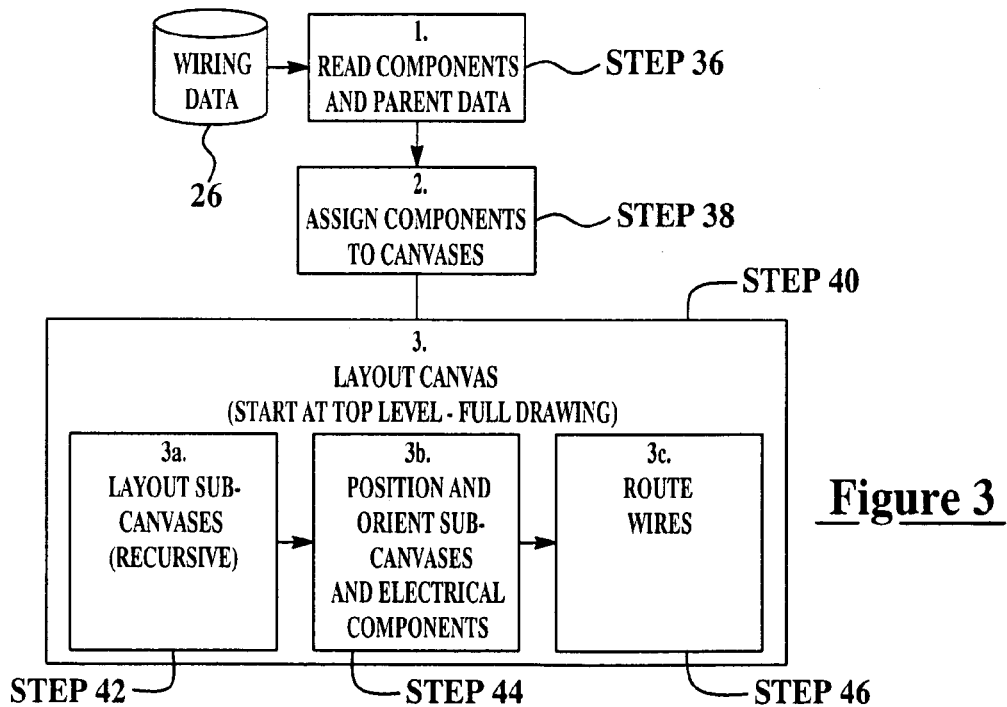
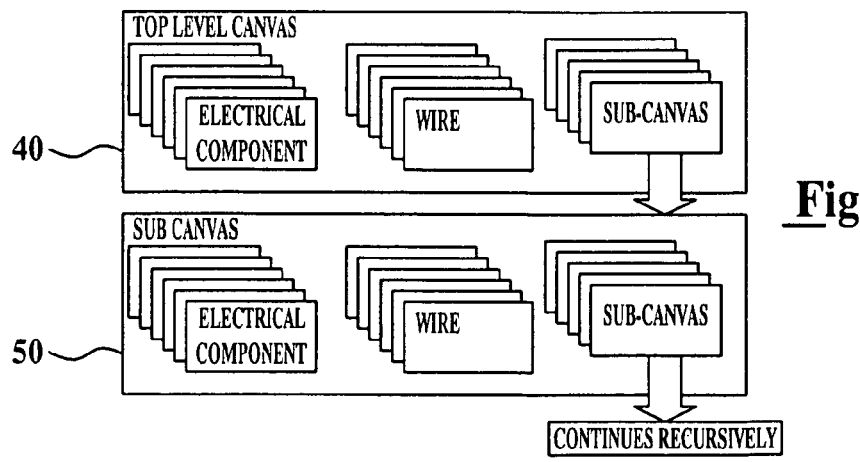

METHOD FOR CREATING BOX LEVEL GROUPINGS OF COMPONENTS AND CONNECTIONS IN A DYNAMIC LAYOUT SYSTEM

FIELD OF THE INVENTION

The present invention generally relates to automatic generation of dynamic layout system having internal box layout method for use in the field of complex electrical systems.

BACKGROUND

Complex systems, such as modern aircrafts, can involve hundreds of miles of wiring. Wires are used to distribute power and data to various types of electrical equipment. Diagrams illustrating representations of complex systems are called schematic diagrams. Schematic diagrams include multiple components to illustrate the subject matter of the particular diagram. For example, in the aircraft industry, electrical wiring diagrams are used to illustrate all of the conductive paths among the various elements of the aircraft. Thus, the term component used herein refers to any type of element included in the particular schematic diagram to illustrate the desired subject matter. In electrical wiring diagrams, for instance, components include modules, line replaceable units, plugs, switches, buses, power sources, grounds, wires, connectors, and the like.

Typically, the schematic diagram is embodied in a set of multiple hard copy sheets that each includes a relatively small portion of the overall schematic diagram. Thus, each sheet in a set includes references to other sheets where the portion of the schematic diagram is continued. These references are typically called "off-sheet references." The hard copy sheet sets are very time consuming and difficult for users, such as maintenance personnel, to use, particularly when they need to reference more than one component. Users must manually locate one of the components in the off-sheet references and then trace the connection to the other component through one or more additional sheets. In addition, many times a component is illustrated on multiple sheets, such as when the component is included in more than one conductive path. Thus, a user must first locate the sheet that includes the desired conductive path associated with the component.

The aerospace industry is moving away from the manual production of technical illustrations including publishing of traditional Wiring Diagram Manuals and System Schematic Manuals. The component information that exists in the manuals may be distributed and may be used to generate drawings dynamically. For example, a user might generate a wiring drawing that traces a signal path from source to ground, or a drawing that shows all the wires in a single bundle, or a drawing that shows all the components in a single airplane system.

Methods for automatically generating dynamic diagrams are disclosed in a related application, US Patent Office doc number 20050114096, entitled "Method, system and computer program product for automatically generating a subset of task-based components from engineering and maintenance data", the contents of which are herein incorporated by reference in its entirety.

The drawings are dynamically generated for task-specific use; suppliers, vendors, and operators can directly modify the databases, view the resulting drawings immediately, and publish the changes back to the original creator of the dynamic drawings.

The existing dynamic layout process illustrates schematic diagrams as a "canvas" consisting of a grid layout where the components are located. Each component is placed in a (column, row) location in the grid and connections are routed between components.

For example, FIG. 1 illustrates a diagram of a canvas of an electrical layout of a maintenance system in an aircraft that is generated using existing dynamic wiring layout technology. FIG. 1 shows a dynamically generated wiring diagram of a canvas for an airplane system without defined groupings of related components. The existing dynamic layout processes do not represent groupings of related components.

While existing processes suit their intended purpose, there remains a need for a system and method that operates to dynamically generate dynamic layouts representing groupings of related components.

SUMMARY

Generally, the present invention provides a dynamic layout system and method that includes a Box Internal Layout Methodology that operates to expand the dynamic layout process to make it capable of rendering one or more boxes having groupings of components within each box, box internals, connectors on a box, and boxes within boxes.

BRIEF DESCRIPTION OF THE DRAWINGS

These and other objects, features and advantages of the present invention will become apparent from the following detailed description and the appended drawings in which:

FIG. 2 illustrates a system diagram of the dynamic layout system used to create box level groupings of components in accordance with one embodiment of the present invention.

FIG. 3 illustrates a flowchart of the dynamic layout system methodology used to create box level groupings of components in accordance with one embodiment of the present invention.

FIG. 4 illustrates a flow diagram showing of a technique that creates box level groupings of components in accordance with one embodiment of the dynamic layout system of the present invention.

DETAILED DESCRIPTION OF THE INVENTION

Figure 1:
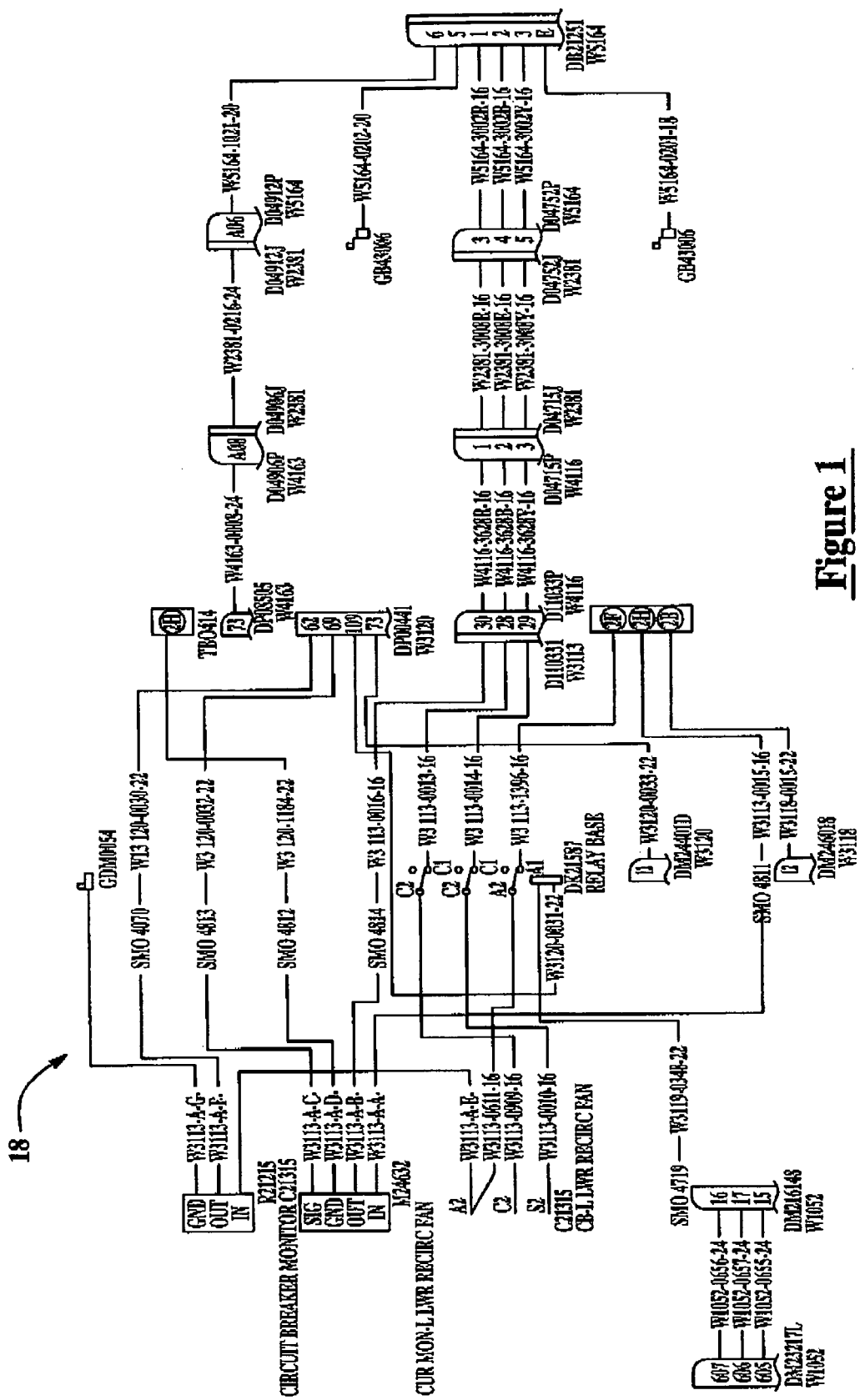
FIG. 1 illustrates a diagram of a canvas of an electrical layout of a maintenance system in an aircraft that is generated using existing dynamic layout technology.

The present invention will be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. Like numbers refer to like elements throughout.

The invention will make the level of information contained in dynamically generated diagrams much more comparable to the information contained in wiring diagrams created by illustrators. The invention will improve the clarity of the rendered diagram-component. The invention can be used in both engineering specification diagrams and production diagrams.

The method, system and computer program product for automatically generating a box internal layout methodology of the present invention may be implemented on any type of system that includes connections and components that are combined into a system diagram representing, for example, but not limited to wiring or hydraulic systems.

The methodology implemented on each system may be performed on a computer system or network having at least one client element, at least one storage element, and at least one processing element, such that requests for information may be received by the client element, various types of information may be stored in the storage element, and selections of appropriate data from the storage element may be made by the processing element based at least in part upon the received requests. In addition, the system may include at least one-generation element to generate diagrams reflecting the selected data, if desired.

A full dynamic layout diagram is a Canvas. A Canvas represents a schematic of a system layout and contains nodes, which are components, and connectivity elements. A canvas also contains sub-canvases that may have connections attaching them to components or other sub-canvases. Each sub-canvas may also include components, connectivity elements, and sub-canvases. The Box Internal Layout Methodology of the present invention expands the dynamic layout by providing a sub-canvas including one or more boxes and components inside a canvas.

A canvas having an internal box layout structure provides: nodes defined by components, edges defined by connective elements, and one or more sub-canvases, wherein each sub-canvas is defined by a combination of one or more nodes and edges. A storage device for storing component parent and child data indicating which box a component belongs to, wherein a box includes one or more components that each have associated parent data. Each component without associated parent data is not included within a box.

In accordance with an embodiment the dynamic layout system is created as a specific non-limiting example of implementing the box level methodology of the present invention as shown in FIGS. 3-6. "Boxes" on wiring diagrams indicate groupings of components for equipment such as Line Replaceable Units (LRU), Panels, and Wiring Interface Assemblies (WIA). Each box may have electrical equipment, wires and other sub-boxes internal to the box. Also, each box may also have equipment, such as connectors, positioned on the outside of the box that serves as an interface between boxes or other equipment. Wiring diagrams created by illustrators and through use of dynamic wiring layout technology show boxes with internal equipment within to help give a user of the diagrams a better representation of the wiring system. The boxes help clarify the wiring system, especially in complex drawings.

Also, FIG. 2 illustrates a system diagram of the dynamic layout system used to create box level groupings of components in accordance with one embodiment of the present invention. As discussed herein, the dynamic layout system may be implemented on any type of system having components, connectivity elements and sub-canvases.

More particularly, FIG. 2 illustrates an embodiment of the system of the present invention in which a request for nodes having one or more components having associated parent data and is received by the client element and transmitted from the client element to the processing element. The processing element then selects the appropriate data from storage element based upon the received request, as explained in detail below. The processing element then may transmit the selected data to a generation element where a diagram of the subcanvas associated with each parent/child sets of components may be generated, if desired. The system also may include a display element to which the generated diagram may be transmitted for viewing by a user. Although FIG. 2 illustrates one embodiment of how data is transmitted among the client element, processing element, storage element, and, optionally, the generation element and display element, data may be transmitted among the client element, processing element, storage element, and, optionally, the generation element and/or display element in any other manner known to those skilled in the art.

The processing element(s) of one embodiment may be embodied by a server, or some other type of computing device. For example, the server may be a web server and an application server that may be located on the same physical device or the web server may be separate from and in communication with the application server via the Internet, intranet or any other computer network. The client element 22, processing element 24, storage element 26, and, optionally, the generation element 28 and/or display element 30 may be part of a single workstation, computer, server or other computing device and, as such, may communicate with each other via internal transmissions. In an alternative embodiment, however, the client element 22, processing element 24, storage element 26, and, optionally, the generation element 28 and/or display element 30 may be distributed as parts of different workstations, computers, servers or computing devices that may be in different physical locations and in communication with each other via the Internet, intranet or other computer network(s) 32. To be consistent, the discussion hereinafter refers to the different elements of the system 20 as being distributed, unless otherwise stated.

The storage element 26 may be a database or any other type of storage device known to those skilled in the art. The storage element 26 may be part of one or more of the client element(s) 22 and/or one or more of the processing element(s) 24, or may be separate from the client element(s) 22, and the processing element(s) 24 and in communication with one or all of the elements via the Internet, intranet or other computer network(s) 32. Regardless of the configuration, if the storage element 26 is a database of wiring data and component data having defined parent and child relationships between each related component, it may be accessed by other elements of the system 20 via an interface, such as, but not limited to, a common object request broker architecture (CORBA), active data object (ADO) interface or open database connectivity (ODBC) interface.

The storage element therefore includes information regarding the wiring harnesses, wiring diagrams of the desired type of schematic and the connections among the connectors and components in a system such as, but not limited to an electrical system in an aircraft defining parent and child data associated with each component. The storage element may be populated in any manner known to those skilled in the art, from manually to automatically.

The client element(s) 22 represent the device or devices that users of the system 20 may utilize to request associated parent child component data, as will be explained in detail below. The client element(s) 22 may be a laptop computer, a personal computer or workstation, networked personal computers or workstations, or any other type of computing device or configuration operating on any type of computer platform and capable of communications with the processing element(s) 24. Thus, in some embodiments, the display element 30 may be part of the client element 22. For example, the client element(s) 22 may support a browser interface to permit communications with the processing element(s). The browser interface is generally an Internet browser, but other browser interfaces capable of soliciting and receiving user input, and, in a distributed environment, communicating with a computer network may be utilized if desired. The system 20 may include many client elements 22 such that many users may utilize the system 20. The client element(s) 22 may physically be located anywhere as long as the client element(s) 22 are in communication with the processing element(s) 24 either via internal communications or via the Internet, intranet or other computer network in distributed environments.

As described above, the processing element(s) 24 of one advantageous embodiment may include a web and application server(s), which may utilize any modern operating system, such as, but not limited to, Microsoft Windows, UNIX, or Linux, and any modern web development platform, such as, but not limited to, JAVA, commercially available from Sun Microsystems, Inc. One or more application program(s) may reside on the web and application server(s). Among other functions, the processing element(s) 24 provide the techniques (i.e., information/instructions) required to obtain the desired component data including parent and child relationship between components from the storage element 26 and to provide the desired canvas or sub-canvas of components, boxes, and wires to the user, such as via the display element 30 in any appropriate form, such as, but not limited to, a web page form having predefined fields.

The form may be viewed by a user as "screens" via display element 30 and the browser interface. As known to those skilled in the art, the screens may be interactive and prompt the user for the action or information necessary for the system 20 to request certain component subsets, provide the desired subsets and allow any further modification of the subset, as explained in detail below. After the user submits responses to the prompts provided by a screen and/or selects certain options presented on the screen, the processing element(s) 24 can determine the content and prompts to be provided by successive screens. The processing element(s) 24 may access/query the storage element 26 to provide the content for any of the screens, such as a diagram of the requested parent child component data, based upon the actions taken by the user and/or the request of the user. For example, if a user, such as a maintenance worker, requests a certain grouping of components within a canvas, the processing element(s) 24 receive the request from the user via a client element 22 and select the appropriate data from the storage element 26 to generate the requested groupings of components as one or more boxes, sub-canvases, and/or components within the canvas. The generation element 28 then may utilize the selected data to generate a diagram of the associated parent child component data grouped together alone or in combination with other boxes having associated sub-canvas within a top level box and components without parent data grouped together in an associated sub-canvas populate and format a screen containing the requested canvas having an internal box layout structure or selected portions of the canvas in diagram form, and submit the screen to the display element 30 for viewing by the user.

In one embodiment of the present invention implemented for creation of a wiring system, for instance, the generation element 28 includes a wiring support product, such as Wiring Illuminator or Wiring Illuminator Web, commercially available from Continental Data Graphics, Inc.

With reference to FIG. 2, the system 20 is capable of automatically generating a dynamic layout of a canvas having an internal box layout structure from one or more sub-canvases grouped into one or more box layouts and components. In particular, client element 22 is capable of receiving a request to generate a top-level canvas having one or more boxes with an internal layout structure, associated components and associated wiring data from a user, the storage element 26 is capable of storing node data defined by parent and child component data as well as individual component data for components within a parent and wire data that includes information regarding the components and the parent and child relationship between related sets of components, and the processing element 24 is capable of automatically selecting portions of the node data and connectivity data from the storage element 26 that satisfy the request for a canvas or one or more selected portions of the canvas including one or more sub-canvases. In some embodiments, the generation element 28 may then generate a diagram of a canvas including one or more sub-canvas connected according to the parent/child relationships of components and wires within each sub-canvas and associated components not having related parent data.

The storage element 26, therefore, receives node and connectivity data regarding components and the connections among the components from various sources, such as from engineering and maintenance data sources, which include schematic diagrams and associated data.

In one embodiment of the present invention, shown in FIGS. 3-6, the components represent the elements of aircraft wiring diagrams, such as modules, line replaceable units, plugs, switches, buses, power sources, grounds, wires, connectors, and the like. In other embodiments of the present invention, the components could represent the elements of any other type of schematics, such as a hydraulic, fuel or any other type of subsystem for any type of structure, such as, but not limited to automobiles, ships, buildings, and the like.

The storage element 26 therefore includes information regarding the components of the desired type of schematic and the connections among the components within internal boxes forming sub-canvases within each canvas. The storage element 26 may be populated in any manner known to those skilled in the art, from manually to automatically. For example, in one embodiment of the present invention, the storage element 26 may be at least partially populated using an electronic graphic recognition program, as described in U.S. patent application Ser. No. 09/971,283, entitled "Method, Computer Program Product, and System for Performing Automated Linking Between Sheets of a Drawing Set," U.S. patent application Ser. No. 09/971,155, entitled "Method, Computer Program Product, and System for Creating and Viewing an Intelligent Graphics File Including Parts Information," and U.S. patent application Ser. No. 09/971,149, entitled, "Method, Computer Program Product, and System for Performing Automated Text Recognition and Text Search Within a Graphic File," all of which are incorporated herein in their entirety by reference.

As described in the above-referenced applications, legacy graphic files, such as raster graphic files, of the desired schematics may be reviewed by a recognition application, which may be a commercial application program that separates the graphic artwork from the text and performs optical character recognition (OCR) on the electronic graphic files. The recognition application may be provided as an image-processing engine in the form of a software library. Data and heuristics supplied by a system builder facilitate the recognition application to accurately identify the reference designations and the relationships among the reference designations within the legacy graphic file. Reference designations include not only the alphanumeric text included in the graphic, but also the graphics that represent the components. For example, the system builder supplies the recognition application with character set examples, alphanumeric rules, character size ranges, and graphic patterns for the reference designations that the system builder may expect in the legacy graphic file. In the same way, the system builder may use the heuristics to manipulate which reference designations are discovered by the recognition application such that certain reference designations may be ignored. The recognition application, thus, may discover and record the reference designations and the relationships among the reference designations present in the legacy graphic file. One example of a commercial application program that may serve as the recognition application is Cartouche, provided by RAF Technology of Redmond, Wash.

The reference designations and the relationships among the reference designations then may be stored in the storage element 26 to be available for extraction when desired.

In addition, or alternatively, the storage element 26 may include information regarding the components and the connections among the components from other sources that extract such information. For example, the storage element 26 may include information from Computer-Aided Drawing (CAD) databases, wiring databases, repair/replacement procedures, fault isolation manuals, maintenance manuals, wiring diagram manuals, schematics manuals, as well as SGML or XML datastreams derived from any of these sources.

Once the parent/child relationship data associated with each component within each canvas is assembled into the storage element 26, boxes having related parent child component sets maybe defined from the parent child relationship data.

The present invention, therefore, provides a method, system and computer program product for automatically generating sub-canvases from the parent child component data, as described below.

FIG. 3 illustrates a flowchart of the dynamic wiring layout system methodology used to create box level groupings of electrical components in accordance with one embodiment of the present invention.

In general a method for generating dynamic layout system of an internal box layout structure of groupings of electrical components includes the steps of: creating a plurality of boxes for each related components having parent data; assigning a plurality of component to a sub-canvas based on the component associated parent data; and laying out a top-level canvas by grouping sub-canvases within boxes. More particularly the step of laying out a top-level canvas includes the steps of laying out one or a plurality of sub-canvases, positioning and orienting the following: sub-canvases and components within the top-level canvas; and routing connections between the sub-canvases and components to create the top-level canvas.

FIG. 3 shows a flowchart of the high-level steps in the invention methodology applied to a wiring system. More particularly, FIG. 3 illustrates a block diagram illustrating the system and the flow of data among the nodes and edges within a canvas that provide connectivity data, select portions of each of the sub-canvases, nodes, and connections and may generate a diagram of the selected sub-canvases, nodes, and connectivity data according to one embodiment of the present invention.

In Step 36, the parent and child data associated with each component is read from the data source. The components "parent" data indicates to which box the component belongs. A component without a parent is not in a box. A box is created for each component having a parent. In Step 38, a sub-canvas in a container is created for each box and each component is assigned to a sub-canvas based on its parent data. In Step 40, the components and edges (wires) are positioned and routed starting at the highest-level canvas (full diagram) made from a plurality of sub-canvases. In Step 42, each sub-canvas in the current canvas is laid out. Note that step 42 is recursive and refers back to Step 40. In Step 44, the laid out sub-canvases and components are positioned and oriented in the current canvas. In Step 44, the edges (wires) are routed between the sub-canvases and components.

FIG. 4 illustrates a flow diagram of a recursive technique that creates sub-canvases of box level groupings of electrical components within a canvas. FIG. 4 illustrates a flow diagram showing of a technique that creates box level groupings of electrical components in accordance with one embodiment of the dynamic wiring layout system of the present invention.

As shown in FIG. 4, dynamic layout system and method box level groupings of electrical components shows the recursive nature of the canvas-sub-canvas structure used in the present invention. The canvas-sub-canvas structure provides a top-level canvas 40 includes a plurality of: components, connections in the non-limiting form of wires and sub-canvases, and wherein each sub-canvas 50 also includes a plurality of components, connectivity elements and sub-canvases.

Any boxes inside this top-level diagram are sub-canvases to the top-level canvas. Each of these sub-canvases is also a canvas that can contain electrical components, wires, and sub-canvases. The methodology and data structures are recursive so the diagram can have many levels of boxes inside of boxes.

The canvases are positioned starting with the lowest level of sub-canvas and progressing outward to the next level of sub-canvas. The final canvas level is the full diagram of an entire system.

Figure 5:
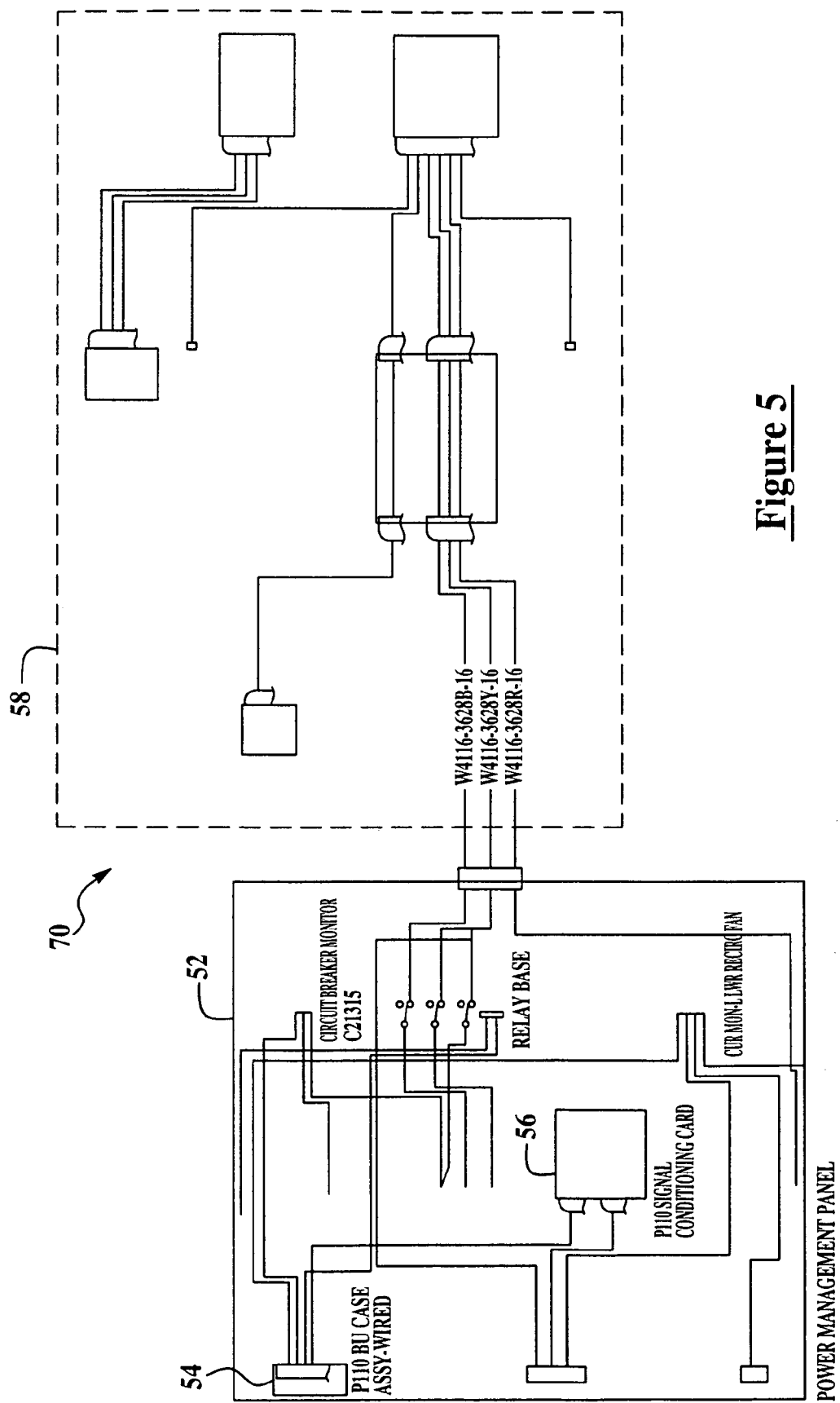
FIG. 5 illustrates a diagram of a canvas having an internal box layout created using the canvas shown in FIG. 1.
Figure 6:
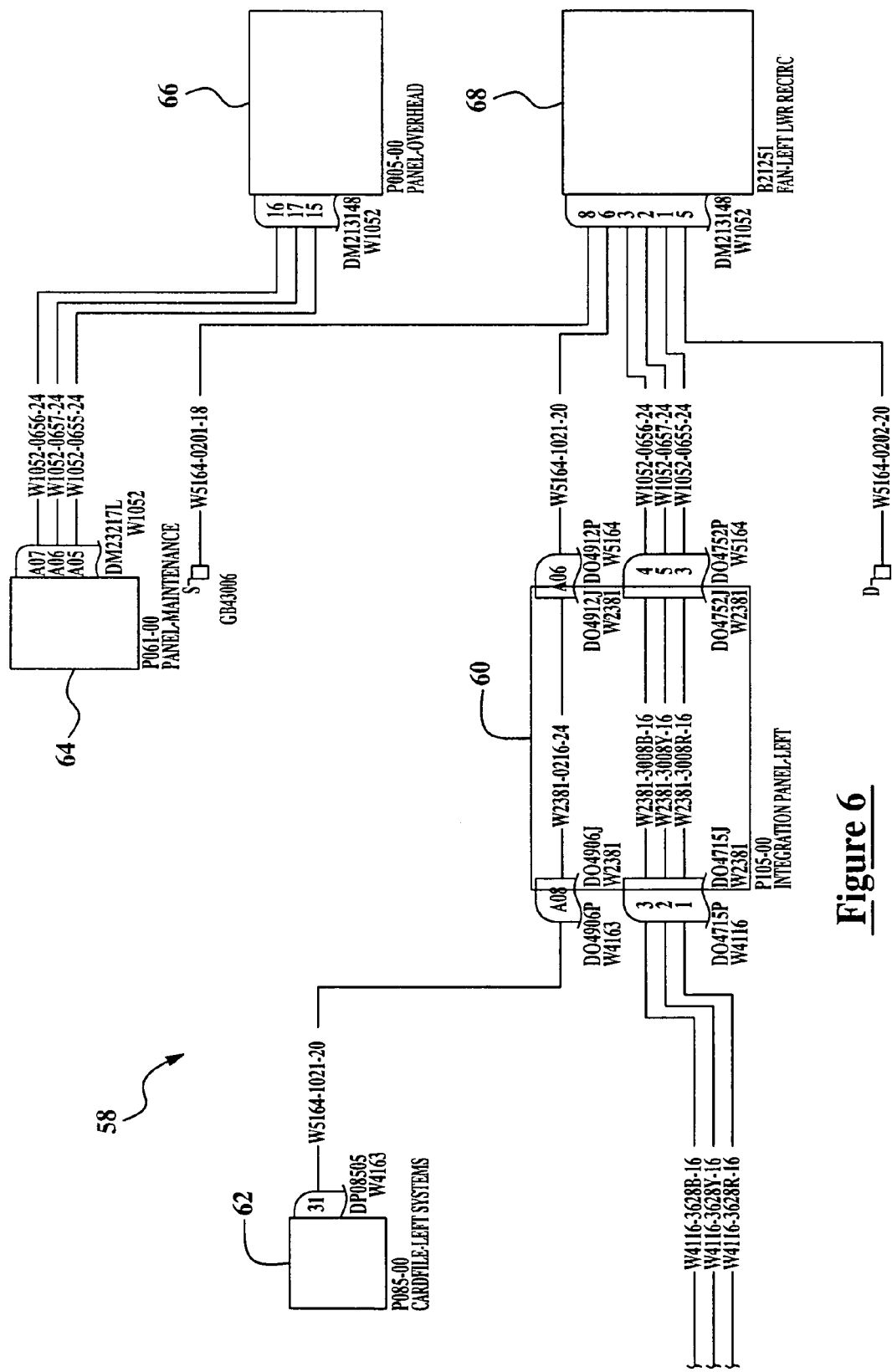
FIG. 6 illustrates an enlarged view of a portion of the canvas shown in FIG. 5.

FIGS. 1, 5, and 6 show the differences between dynamically generated diagrams without boxes and dynamically generated diagrams with boxes.

FIG. 5 illustrates a diagram of a canvas having an internal box layout created using the canvas without an internal box layout. FIG. 6 illustrates an enlarged view of a portion of the canvas shown in FIG. 5. More particularly, FIGS. 5-6 illustrates a canvas 70 of an airplane wiring system with an internal box layout structure.

FIG. 5 illustrates an example of sub-canvases within a sub-canvas within the top-level canvas for a dynamically generated wiring diagram for an airplane system diagram with the box-internals functionality provided by this invention. This drawing groups related components, making it easier to understand their function.

Referencing both FIGS. 5-6, the top level canvas 70 has a sub-canvas box 52 displaying internal components, sub-canvases and associated wiring associated with a power management panel. The sub-canvas box 52 further has disposed therewithin a sub-canvas 54 representing a BU Case assembly in electrical communication with and connected via associated wiring harnesses and connecting components to a sub-canvas 56 representing a signal conditioning card, to a circuit breaker monitor labeled C21315, a relay base, and a lower recirculation fan. The power management panel 52 is then in electrical communication with a portion of the diagram shown within a dashed line to the right of the panel 52 in FIG. 5 and shown in more detail as canvas portion 58 in FIG. 6. power management panel 52 connects to portion 58 via wiring harness W4116 having wires 3628B-16, 3628Y-16, and 3628R-16

As shown in more detail in FIG. 6, portion 58 of the top level canvas 70 further has a sub-canvas 60 left integration panel box 60 in communication with wiring harness W4116 at pins 3, 2, and 1 respectively of associated components D04715P connected to D04715J, and wherein components D04715P and D04715J are further connected via wiring harness W2381 having associated wires 3008B-16, 3008Y-16, and 3008R-16 to components D04752J and D04752P; and components A06 and A08 are connected within the sub-canvas left integration panel box 60 via wire W2381-0216-24. Thus components D04715P, D04715J, and D04752J, D04752P have related parent and child data that allows the grouping of each of these components within the sub-canvas 60. Also shown is wiring layouts between and within other sub-canvases within boxes which include a left lower recirculating fan 68, an overhead panel 66, a maintenance panel 64, and a left systems cardfile 62. Thus, each sub-canvas 60, 62, 64, 66, 68, have related groups of components and associated wiring formed therewithin. The top level canvas 70 is formed by sub-canvases 60, 62, 64, 66, 68, 52 in combination with component GB43006 via wire W5164-0201-18. shown in FIG. 1.

While the embodiments described above provide specific examples of how techniques for providing particular connectivity data and groupings of component data within a canvas having a box-internal layout structure are created based upon the content of certain requests, any other type of request for any other related sub-canvases, connectivity elements and components may be received and the canvases created by the method, system 20 and computer program product of the present invention.

The dynamic layout system 20 that creates box level groupings of components is illustrated as a process flow diagram in FIGS. 2-4. The system 20 of the present invention and, in particular, the processing element 24, and storage element 26, are typically embodied by a processing element and an associated memory device, both of which are commonly comprised by a computer or the like. As such, the system of the present invention generally operates under control of a computer program product to provide the functionality disclosed herein in conjunction with the various components of the system, according to another aspect of the present invention. The computer program product for constructing the desired subset(s) of components includes a computer-readable storage medium, such as the non-volatile storage medium, and computer-readable program code portions, such as a series of computer instructions, embodied in the computer-readable storage medium.

In this regard, FIGS. 2-4 are block diagrams and flowcharts of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems, which perform the specified functions or steps, or combinations of special purpose hardware and computer instructions.

Thus, the method, system 20 and computer program product for automatically generating a canvas having an internal box layout structure according to the present invention are capable of efficiently creating groupings of components, wires and boxes from electronic schematic diagrams and associated data. Because the method, system and computer program product automatically select portions of connective elements and component data that satisfy a request for a canvas shown in a dynamic layout system diagram subset of components, the present invention assigns automatically components to canvases, which greatly reduces the amount of time and labor necessary to generate related groupings of components in a full drawing layout of the canvas having an internal box layout structure.

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

What is claimed is:

1. A method for automatically generating an dynamic layout of a top-level canvas with an internal box layout structure for pre-designed engineering specification diagrams and production diagrams comprising the steps of:

receiving a request to assign a plurality of components within the canvas;

assessing both component data and associated connectivity data for information regarding related components having associated parent and child data for components having a parent component and for components without a parent component, each parent component associated with one or more child components by a respective predetermined physical connection;

associating connectivity data comprising said pre-determined physical connection with the component data; and automatically laying out the top-level canvas having an internal box layout structure, said laying out including grouping said related components comprising an associated parent component within a box and laying out said respective predetermined physical connections.

2. The method of claim 1, further comprising the step of:

reading in the parent and child component data associated with each component from a data source.

3. The method of claim 2, wherein the data source comprises related component and connectivity data.

4. The method of claim 1, further comprising the step of:
creating a sub-canvas for each related group of component, each group having associated parent and child component data.

5. The method of claim 4, further comprising the step of:
assigning the related parent and child components to a box comprising said sub-canvas based on the related parent and child component data, wherein a component without a parent is not assigned to a box comprising said sub-canvas.

6. The method of claim 4, further comprising the step of:
creating a container for each sub-canvas created.

7. The method of claim 6, further comprising the steps of:
positioning related components and connective elements within a subcanvas, said connective elements each comprising a respective predetermined physical connection; and
routing each of the connections comprising said connective elements between each of the sub-canvases according to said respective pre-determined physical connection to create the top-level canvas.

8. The method of claim 4, further comprising:
creating a plurality of sub-canvases that each include one or more second sub-canvases, said second sub-canvases including associated connective elements and components not associated with a parent component.

9. The method of claim 8, further comprising the step of:
repeating the step of creating a plurality of sub-canvases until each component and connectivity data associated within the top-level canvas has been associated with a sub-canvas.

10. The method of claim 1, further comprising the step of:
generating the dynamic layout by using a computer executing computer software instructions.

11. The method of claim 1, wherein said pre-designed engineering specification diagrams and production diagrams comprise a wiring diagram.

12. The method of claim 1, wherein said pre-designed engineering specification diagrams and production diagrams comprise a wiring diagram for an aircraft.

13. A method for generating a dynamic layout for pre-designed engineering specification diagrams and production diagrams comprising the step of:
generating a top-level canvas having an internal box layout structure;
creating a plurality of boxes within said sub-canvas for related components having associated parent data, said associated parent data comprising a parent component, each parent component associated with one or more child components by a respective pre-determined physical connection;
assigning a plurality of said related components to a respective box based on each component's associated parent data; and
laying out the top-level canvas according to said plurality of boxes and said respective predetermined physical connections.

14. The method of claim 13, wherein the top-level canvas comprising a plurality of sub-canvases, and associated connectors in said box layout structure within each sub-canvas.

15. The method of claim 13, wherein the steps of laying out the top-level canvas further comprises the steps of;
grouping sub-canvases within associated boxes;
laying out a plurality of sub-canvases;
positioning elements selected from one or more sub-canvases, and electrical components within the top-level canvas;
orienting each of the elements selected from one or more sub-canvases, and electrical components within the top-level canvas; and
routing connectivity elements between the sub-canvases and associated components to create the top-level canvas, said connectivity elements comprising said respective pre-determined physical connections.

16. The method of claim 13, wherein said pre-designed engineering specification diagrams and production diagrams comprise a wiring diagram for an aircraft.

17. A system for automatically generating a dynamic layout canvas including pre-designed physical connections for engineering specification diagrams and production diagrams comprising:
a client element capable of receiving a request to create a top-level canvas from a user;
a storage element adapted to store node data and connectivity data that includes information regarding components and the parent/child relationship between related sets of components, said parent/child relationship comprising a pre-determined physical connection between a respective parent and child component; and
a processing element adapted to automatically select portions of the node data and the connectivity data from the storage element that satisfies the request for creating a top-level canvas;
said processing element further adapted to automatically lay out the top-level canvas having an internal box layout structure, said internal box layout structure comprising groupings of related components within a box, said related components comprising an associated parent.

18. The system of claim 17, wherein the client element is adapted to receive a request from a user to generate one or more of said boxes, related components, and associated connectivity data.

19. The system of claim 17, wherein the storage element is adapted to store node data defined by both parent and child component data and individual component data associated with components without a parent component.

20. The system of claim 17, wherein the processing element comprises:
a generation element adapted to generate a diagram of the top-level canvas including one or more sub-canvases connected according to said parent/child relationship.

* * * * *